US007068858B2

(12) United States Patent
Allen et al.

(10) Patent No.: US 7,068,858 B2
(45) Date of Patent: Jun. 27, 2006

(54) PROJECTION SYSTEM UTILIZING SLM PIXELS THAT INCLUDE SLM PIXEL REGIONS SATISFYING ACCEPTABLE DEFECTIVE SLM PIXEL POLICY AND SLM REGIONS FAILING POLICY

(75) Inventors: William Allen, Corvallis, OR (US); Mark W. Van Order, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 819 days.

(21) Appl. No.: 10/286,636

(22) Filed: Oct. 31, 2002

(65) Prior Publication Data

US 2004/0085616 A1 May 6, 2004

(51) Int. Cl.
*G06K 9/32* (2006.01)
*G02B 26/00* (2006.01)

(52) U.S. Cl. ....................................... 382/299; 359/292

(58) Field of Classification Search ................ 382/174, 382/203, 210, 274, 299, 312; 359/237, 292; 345/48, 50
See application file for complete search history.

(56) References Cited

U.S. PATENT DOCUMENTS

| | | | | |
|---|---|---|---|---|
| 5,504,504 | A * | 4/1996 | Markandey et al. | 345/214 |
| 5,608,558 | A | 3/1997 | Katsumi | |
| 5,638,199 | A | 6/1997 | Tsubota et al. | |
| 6,219,443 | B1 | 4/2001 | Lawrence | |
| 6,618,185 | B1 * | 9/2003 | Sandstrom | 359/292 |
| 6,751,005 | B1 * | 6/2004 | Barnick et al. | 359/290 |

FOREIGN PATENT DOCUMENTS

| | | |
|---|---|---|
| EP | 0692728 | 1/1996 |
| JP | 2001265312 | 9/2001 |
| WO | WO 00/69171 | 11/2000 |

* cited by examiner

*Primary Examiner*—Kanjibhai Patel

(57) ABSTRACT

Determining that a plurality of spatial light modulator (SLM) pixels includes one or more first regions of SLM pixels that satisfy an acceptable defective SLM pixel policy, and one or more second regions of SLM pixels that fail the policy, is disclosed. Utilizing the first regions of SLM pixels within a projection system that has a first resolution that is less than a second resolution that would have been provided by utilizing both the first regions of SLM pixels and the second regions of SLM pixels is also disclosed.

55 Claims, 6 Drawing Sheets

PROJECTION SYSTEM UTILIZING SLM PIXELS THAT INCLUDE SLM PIXEL REGIONS SATISFYING ACCEPTABLE DEFECTIVE SLM PIXEL POLICY AND SLM REGIONS FAILING POLICY

BACKGROUND

Projector systems are generally devices that integrate light sources, optics systems, and electronics for front- or rear-projection of images from computers or video devices onto walls or screens, for large-image viewing. They are especially popular among business users who give presentations as part of their job responsibilities. Newer projectors can weigh as little as a few pounds, making them well suited for business travelers. As the quality of projection technology has improved, projectors are also finding their way into peoples' homes for high-definition television (HDTV) and other home entertainment applications. Some industry pundits predict that digital projectors will also become the standard projection technology used in movie theaters.

One type of projection system utilizes spatial light modulators (SLM's) to properly project image data therefrom. Examples of SLM's include liquid crystal display (LCD) SLM's, and digital micromirror device (DMD) SLM's, as well as other types of SLM's. There is typically one pixel on each SLM in the projector for each pixel of image data to be projected. The projection system controls the SLM pixel or pixels in accordance with the pixel of the image data to which the SLM pixel corresponds. The SLM pixel modulates the light that is incident to the SLM pixel in accordance with the image data pixel, so that the projector properly projects the pixel.

A number of SLM pixels needed for a particular resolution are usually included on one electronic device, or a small number of electronic devices, for utilization within a projection system. If an SLM pixel within the SLM electronic device is defective, this means that the pixel of image to which it corresponds within the projection system will not be properly projected. If a sufficiently great number of SLM pixels are defective, the electronic device is usually considered defective, even though the vast majority of SLM pixels may be operable. This can lead to the discarding of the device, which is usually expensive.

SUMMARY OF THE INVENTION

A method of an embodiment of the invention includes determining that a plurality of spatial light modulator (SLM) pixels includes one or more first regions of SLM pixels that satisfy an acceptable defective SLM pixel policy, and one or more second regions of SLM pixels that fail the policy. The method utilizes the first regions SLM pixels within a projection system that has a first resolution. The first resolution is less than a second resolution that would have been provided by utilizing both the first regions of SLM pixels and the second regions of SLM pixels.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview and Methods

Figure 1:
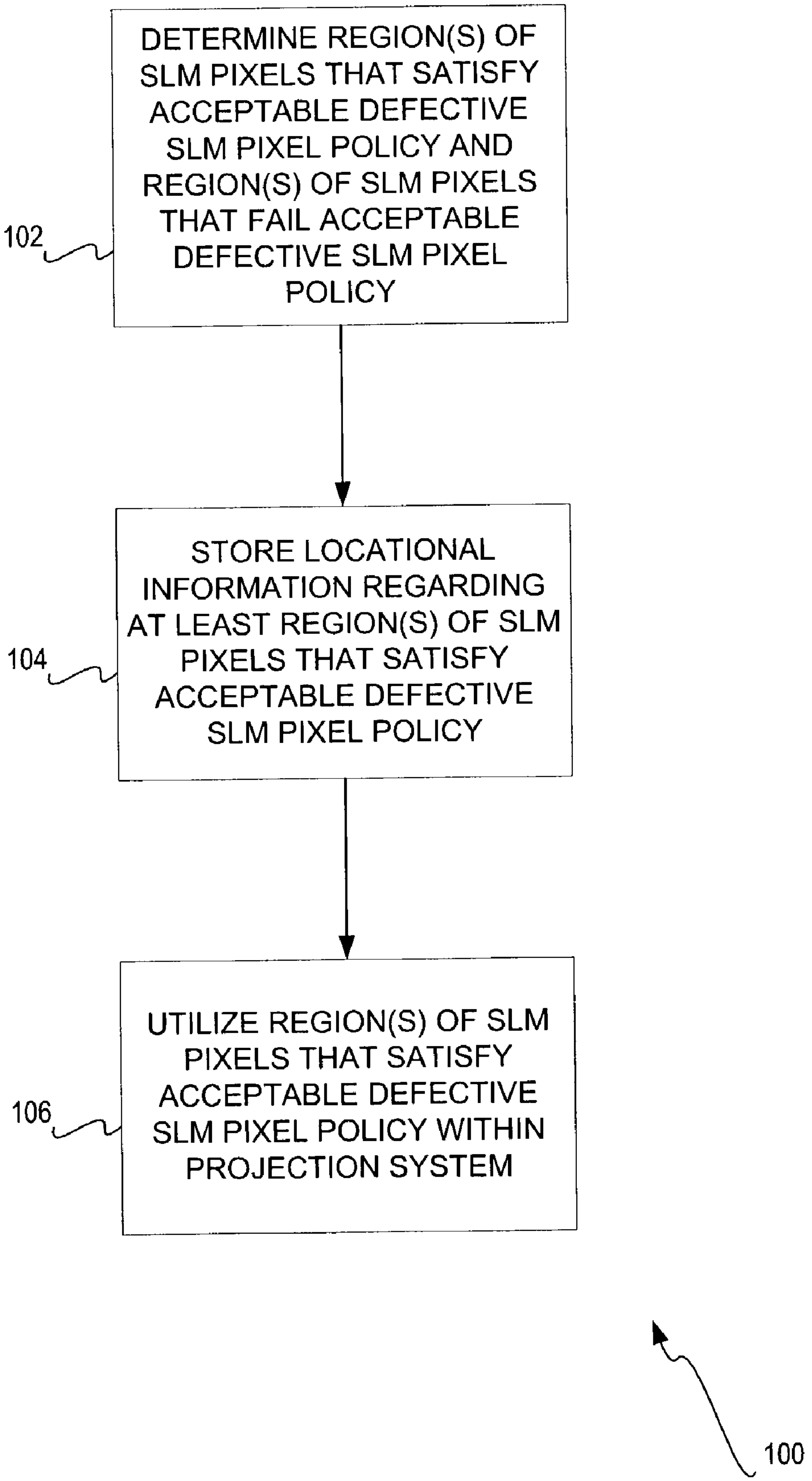
FIG. 1 is a flowchart of a method according to an embodiment of the invention.

FIG. 1 shows a method 100 according to an embodiment of the invention. First, within a number of spatial light modulator (SLM) pixels, the method 100 determines region (s) of SLM pixels that satisfy an acceptable defective SLM pixel policy and region(s) of SLM pixels that fail the acceptable defective SLM pixel policy (102). The number of pixels may be within one or a small number of electronic devices, such as integrated circuits (IC's), digital micromirror devices (DMD's), and/or liquid crystal display (LCD) devices. The acceptable defective SLM pixel policy deems the number of defective SLM pixels that can acceptably be present in the region(s).

For instance, in one embodiment, the presence of one defective SLM pixel within a region of SLM pixels means that the region fails the policy. That is, all the SLM pixels within the region must be operational for the region to be considered as satisfying, or passing, the policy. In another embodiment, the presence of less than a predetermined number of defective SLM pixels within a region still allows the region to satisfy the policy, whereas the presence of at least this predetermined number of defective SLM pixels means that the region fails the policy.

In still another embodiment, the locations of the defective SLM pixels within a region of SLM pixels also determine whether the region satisfies or fails the policy. For instance, defective SLM pixels that are near the edges of the region may be given less weight than defective SLM pixels that are near the middle of the region. Multiplying each defective SLM by its weight, and adding the weights of all the defective SLM pixels, determines the region's score. If the score of the region is less than a threshold score, then the region satisfies the policy, whereas if it is equal to or greater than the threshold score, then the region fails the policy.

FIGS. 2–5 show some examples of determining regions of SLM pixels that satisfy an acceptable defective SLM pixel policy and regions of SLM pixels that fail the policy, according to varying embodiments of the invention. As can be appreciated by those of ordinary skill within the art, the SLM pixel regions depicted in FIGS. 2–5 are for example purposes only, and do not represent the only manners by which a number of SLM pixels can be divided into regions. In other embodiments of the invention, the SLM pixels can be divided into regions that satisfy an acceptable defective SLM pixel policy and regions that fail the policy in accordance with different approaches. Each of the examples of FIGS. 2–5 include a number of SLM pixels that may be present on the same or a small number of electronic devices, such as IC's, DMD's, and/or LCD devices.

Figure 2:
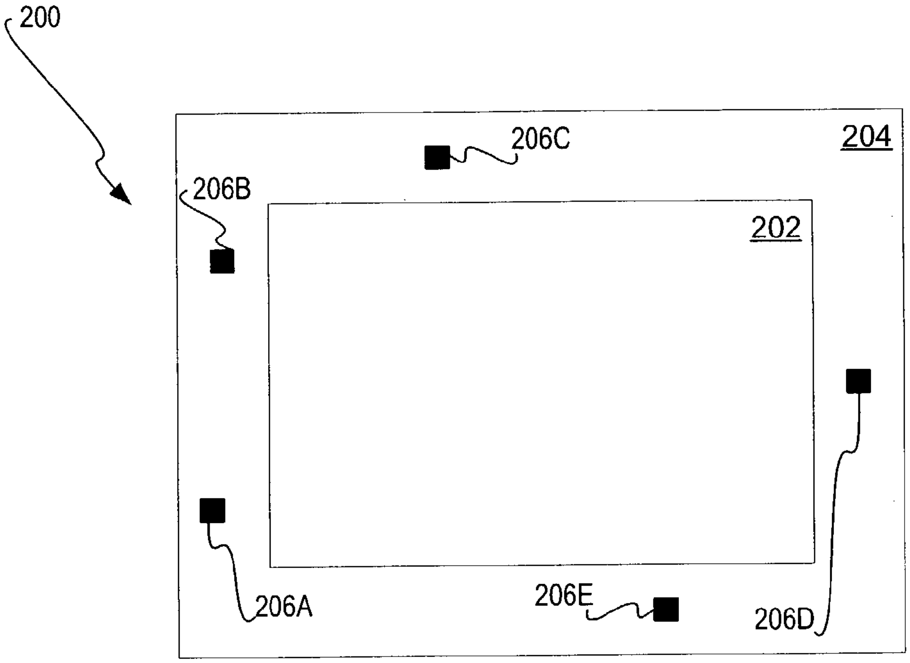
FIGS. 2, 3, 4, and 5 are diagrams of examples of determining region(s) of spatial light modulator (SLM) pixels that satisfy an acceptable defective SLM pixel policy and determining region(s) of SLM pixels that fail the policy, according to varying embodiments of the invention.

In FIG. 2, the number of SLM pixels 200 has been divided into a region 202 that satisfies an acceptable defective SLM pixel policy and a region 204 that fails the policy, according to an embodiment of the invention. The policy in particular deems that a region of SLM pixels is acceptable where it includes no defective SLM pixels. Thus, the region 202 does not include any defective SLM pixels, whereas the region 204 includes the defective SLM pixels 206A, 206B, 206C, 206D, and 206E, collectively referred to as the SLM pixels 206. The example of FIG. 2 may correspond to the scenario where the number of SLM pixels 200, including both the regions 202 and 204, was originally intended to realize a particular resolution, such as XGA resolution, or 1024×768 pixels. However, because of the defective SLM pixels 206 within the region 204, the region 202, as a contiguous subset of the SLM pixels 200, has been determined such that it realizes a lower resolution, such as SVGA resolution, or 800×600 pixels.

Figure 3:
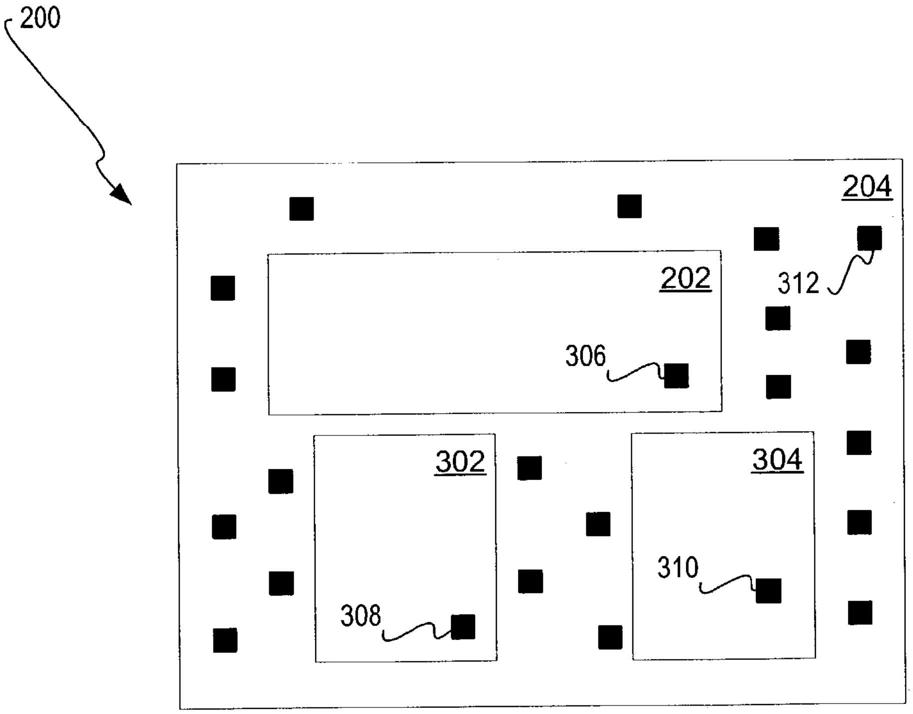

In FIG. 3, the number of SLM pixels 200 has been divided into regions 202, 302, and 304 that satisfy an acceptable defective SLM pixel policy and the region 204 that fails the policy, according to an embodiment of the invention. The policy in particular deems that a region of SLM pixels is acceptable where it includes no more than one defective SLM pixel. Thus, the regions 202, 302, and 304 includes the defective SLM pixels 306, 308, and 310, respectively, such that each of these regions includes no more than a single defective SLM pixel. By comparison, the region 204 fails the policy because it includes a larger number of defective SLM pixels, such as the defective SLM pixel 312. The example of FIG. 3 further depicts the scenario where there is more than one contiguous, and specifically rectangular, region that satisfies the acceptable defective SLM pixel policy.

Figure 4:
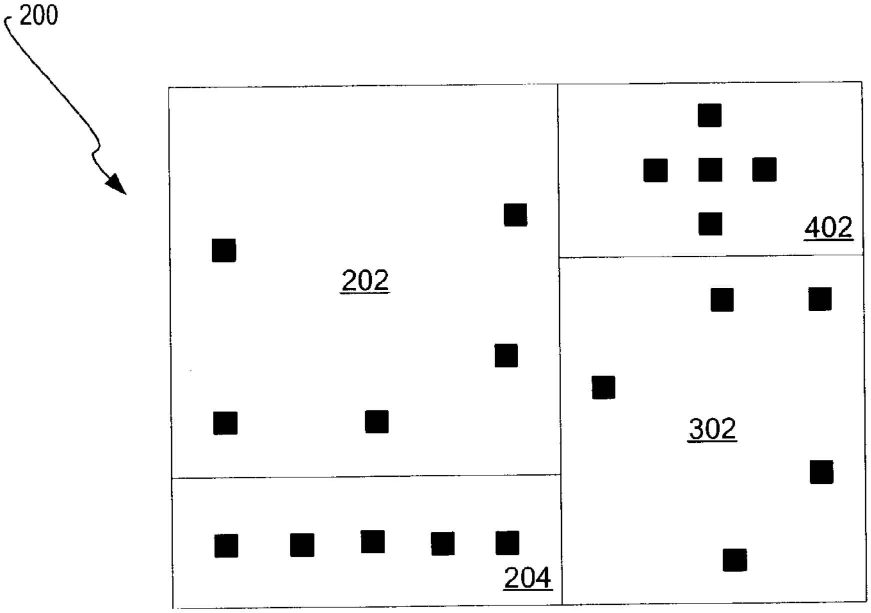

In FIG. 4, the number of SLM pixels 200 has been divided into regions 202 and 302 that satisfy an acceptable defective SLM pixel policy and the regions 204 and 402 that fail the policy, according to an embodiment of the invention. The policy in particular deems that a region of SLM pixels is acceptable where the defective SLM pixels number no more than five, and no defective SLM pixels are located in the middle or central portion of the region. Thus, the regions 202 and 302 satisfy the policy because their defective SLM pixels, indicated as black squares in FIG. 4, number no more than five for each region, and are located at the edges of the region. By comparison, the regions 204 and 402 fail the policy because their defective SLM pixels, also indicated as black squares in FIG. 4, while numbering no more than five for each region, are located in the middle of the region. The example of FIG. 4 further depicts the scenario where there is more than one contiguous, and specifically rectangular, region that fails the acceptable defective SLM pixel policy.

Figure 5:
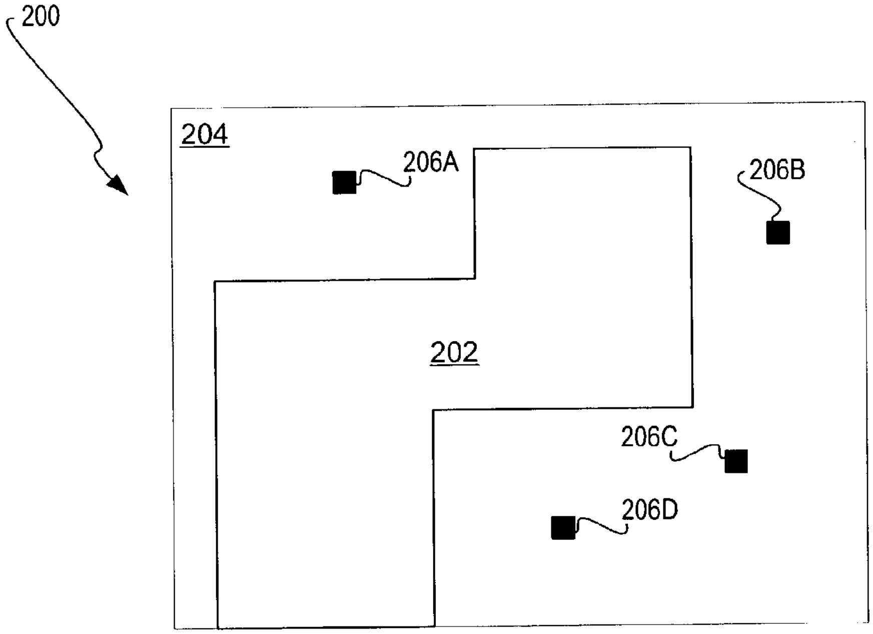

In FIG. 5, the number of SLM pixels 200 has been divided into the region 202 that satisfies the acceptable defective SLM pixel policy and the region 204 that fails the policy, according to an embodiment of the invention. Like the example of FIG. 2, the policy in the example of FIG. 5 specifies that a region of SLM pixels is acceptable where it contains no defective SLM pixels. Thus, the region 202 satisfies, or passes, the policy, whereas the region 204, including the defective SLM pixels 206A, 206B, 206C, 206D, and 206E, fails the policy. The example of FIG. 5 further depicts the scenario where a region is contiguous but not necessarily rectangular in shape.

The determination of the regions in 102 of the method 100 of FIG. 1 can be made at least one of two different times in different embodiments of the invention. First, prior to complete manufacture of the projection system of which the SLM pixels are to be a part, the regions of SLM pixels that satisfy the acceptable defective SLM pixel policy may be determined, and hence the regions of SLM pixels that fail the policy are also implicitly automatically determined. That is, the determination of the regions is accomplished prior to first use of the projection system by an end user.

Second, the end user may determine the regions of SLM pixels that satisfy the acceptable defective SLM pixel policy, and thus implicitly automatically determine the regions that fail the policy. The end user may also identify defective SLM pixels, implicitly determining the SLM pixel regions that pass and/or fail the defective SLM pixel policy. That is, the determination of the regions is accomplished after complete manufacture of the projection system. The projection system may include a set-up mode that projects pixels corresponding to all the SLM pixels, and allows the user to specify one or more regions of SLM pixels that are acceptable to the user, such that the system then uses these user-determined regions when projecting image data. In this embodiment, the acceptable defective SLM policy is thus subjective and user determined. The user him or herself determines which regions are acceptable, and thus satisfy the implicit policy, and which regions are unacceptable, and thus fail the implicit policy.

Furthermore, defective SLM pixels may be identified by a technician, when, for instance, the user sends the projection system back to a service center for repair, calibration, and/or tune-up. Thus, the identification of SLM pixels, and thus the determination of regions of SLM pixels that satisfy and/or fail the acceptable defective SLM pixel policy, can be made at any time, and is not restricted by embodiments of the invention. SLM pixels can become defective and/or operational over the life of the projection system, such that the regions of SLM pixels that satisfy and/or fail the acceptable defective SLM pixel policy may correspondingly change over time.

Referring back to FIG. 1, locational information regarding at least the region(s) of SLM pixels that satisfy the acceptable defective SLM pixel policy is stored (104). This locational information may specify, for instance, the locations of the upper left-hand SLM pixel and the lower right-hand SLM pixel of each region that satisfies the policy. Where these regions are rectangular, this is sufficient information to locate all of the SLM pixels of the regions. In embodiments where the regions are contiguous but not rectangular, or are non-contiguous, more SLM pixels may need to be specified in order to locate properly all of the SLM pixels of the regions. Furthermore, locational information regarding the region(s) of SLM pixels that fail the acceptable defective SLM pixel policy may also be stored. The locational information stored is subsequently utilized by a projection system so that the system knows which SLM pixels are to be used for projecting image data. The locational information may be stored in a non-volatile memory of a projection system, for instance. The locational information may also be stored in a memory, such as a non-volatile memory, of an electronic device, like an integrated circuit (IC), on which the SLM pixels actually reside.

Finally, the region(s) of SLM pixels that satisfy the acceptable defective SLM pixel policy are utilized within the projection system (106). That is, the projection system utilizes the SLM pixels of the regions that satisfy the policy, but not the SLM pixels of the regions that fail the policy, in projecting image data. The number of SLM pixels in the regions that satisfy the policy enables the projection system to realize a certain resolution that is less than the resolution that would have been realized if all the SLM pixels were utilized. This was shown in particular detail in the example of FIG. 2, where utilizing all the SLM pixels 200, including the regions 202 and 204, would have provided for a 1024×768 resolution, whereas utilizing only the SLM pixels of the region 202 provides for an 800×600 resolution. This is generally the case as well, since carving out regions of SLM pixels that satisfy the acceptable defective SLM pixel policy means that regions that fail the policy will not be used, such that a lower actual resolution of the projection system that utilizing only the regions that satisfy the policy is realized.

Furthermore, there may be more of the SLM pixels than are intended to be used, such as that providing for an 1124×868 resolution. There are more of the SLM pixels 200 than are intended to be used, so that if and when defective SLM pixels are identified, regions of SLM pixels that satisfy the acceptable defective SLM pixel policy can more likely be identified that include a sufficient number of SLM pixels to provide for an intended resolution, such as 1024×768 resolution. That is, more SLM pixels are included initially with the understanding that some of them may be defective, but that the ultimate number of regions of SLM pixels that satisfy the acceptable defective SLM pixel policy will be sufficient to yield a desired resolution.

Figure 6:
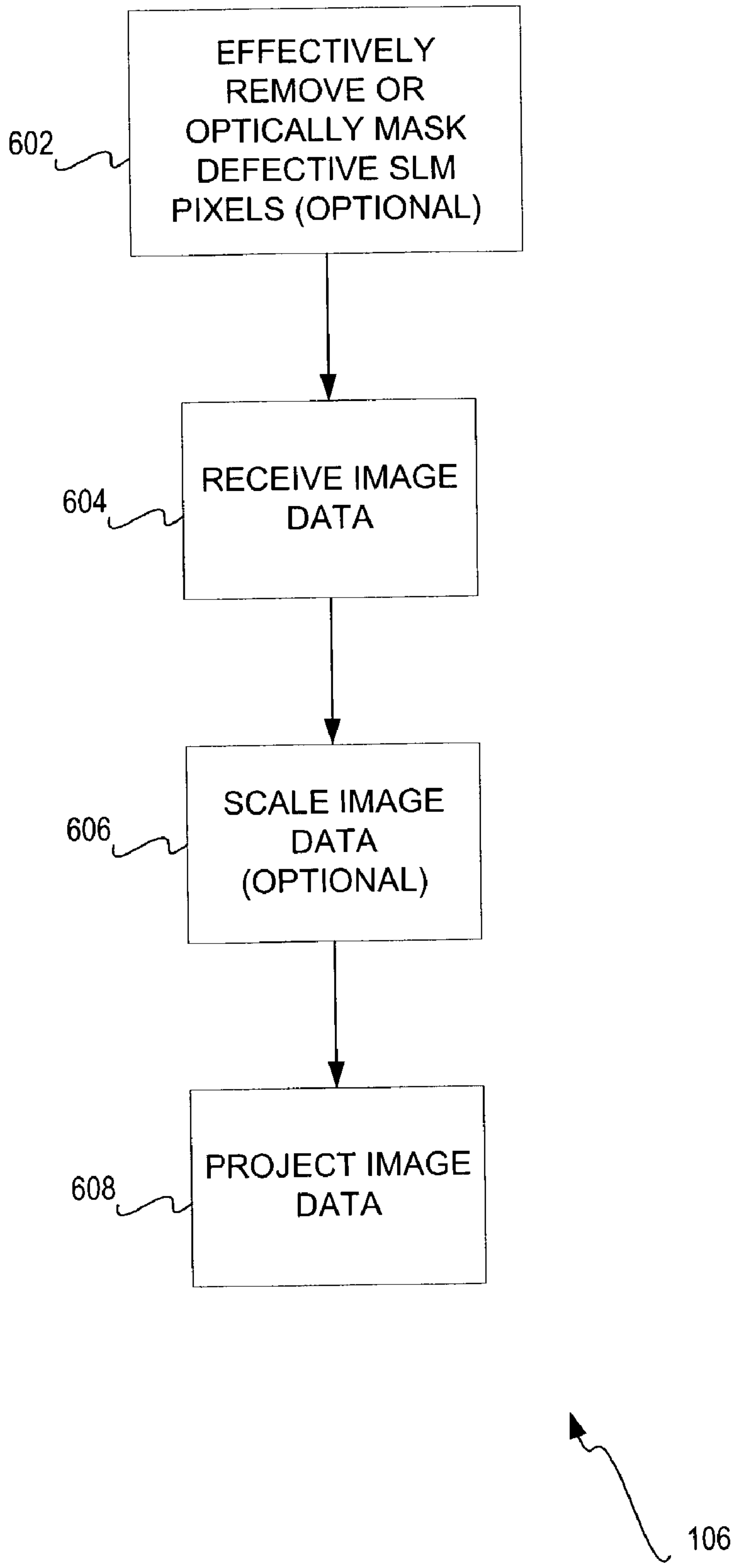
FIG. 6 is a flowchart of a method that shows how utilizing region(s) of SLM pixels that satisfy an acceptable defective SLM pixel policy within a projection system can be accomplished, according to an embodiment of the invention.

FIG. 6 shows how the regions of SLM pixels that satisfy the acceptable defective SLM policy can be utilized within a projection system in 106 of FIG. 1, according to a particular embodiment of the invention. Defective SLM pixels in regions that fail and/or satisfy the policy may be effectively removed or optically masked within the projection system (602), although this is optional. Effective removal may be accomplished by using a laser on or applying a high voltage to the defective SLM pixels, so as to permanently alter the light-modulating capability of these pixels, desirably rendering them unable to project light from the projection system, or projector. Effective removal may be accomplished in other ways as well. It is noted that the removal is effective, as opposed to actual, since the SLM pixels are not actually removed from the electronic device(s) of which they are a part, but rather are rendered so that they no longer modulate light as originally designed. Alternatively, the defective SLM pixels may be optically masked within the projection system, or projector, such that such light is not projected from the system by the masked pixels.

Next, image data that is to be projected by the projection system is received (604). The image data may be received by being coupled to a computer or other electronic and/or computing device that outputs a video signal or other type of signal to be projected. The image data has a given resolution. In one embodiment, the resolution of the image data is the same as that which the projection system realizes by utilizing the regions of SLM pixels that satisfy the acceptable defective SLM pixel policy. In another embodiment, the resolution of the image data is greater or less than that which the projection system realizes by utilizing the regions of SLM pixels that satisfy the policy.

For example, the resolution of the image data may be that which the projection system would have realized if all the SLM pixels were utilized, including not only the regions of SLM pixels that satisfy the acceptable defective SLM pixel policy, but the regions that fail the policy as well. The image data may be XGA resolution, which is the resolution that would have been provided by all the SLM pixels. However, the projection system may now only have SVGA resolution, on account of it utilizing only the regions of SLM pixels that satisfy the acceptable defective SLM pixel policy, and not all the SLM pixels. Furthermore, a non-standard set of SLM pixels may result, such as 1000×667 as an example, such that the image data is scaled to this non-standard set of SLM pixels.

The image data received by the projection system may thus be optionally scaled (606). That is, if the resolution of the image data is not equal to the resolution realized by the projection system, then the projection system scales the image data so that its resolution matches the resolution that the projection system realizes by utilizing only the regions of SLM pixels that satisfy the acceptable defective SLM pixel policy. In the example of the preceding paragraph, for instance, the image data may be scaled down from XGA resolution to SVGA resolution. Up scaling, from a lower resolution to a greater resolution, may also alternatively be accomplished where appropriate.

Finally, the image data is projected by the projection system (608), utilizing the regions of SLM pixels that satisfy the acceptable defective SLM pixel policy. More specifically, light is modulated by the SLM pixels of these regions in accordance with the image data, so that proper contrast and/or color is realized, and then the light is projected outward from the projection system. Internal or external aiming may be necessary so that the projection system properly illuminates the appropriate pixels within the regions of pixels that satisfy the acceptable defective SLM pixel policy. That is, the light generated by the projector may be properly aimed onto the SLM pixels of the regions that satisfy the policy, and not onto the SLM pixels of the regions that fail the policy, so that only the SLM pixels of the regions that satisfy the policy are employed.

Projection of light onto the SLM pixels of the regions that satisfy or pass the acceptable defective SLM pixel policy may be accomplished in one of at least two ways. Each pixel of the image data can be divided into constituent colors, such as red, green, and blue, where each pixel has a value, such as an intensity value, for each constituent color. Therefore, one approach for projecting light is accomplished is by sequentially projecting light of the different colors onto the SLM pixels of the regions that satisfy the policy, sufficiently fast so that the human eye does not perceive the different color components of the image data but rather only sees the image of the image data.

For example, for a given SLM pixel, red light may first be reflected off the SLM pixel, where the SLM pixel is driven to modulate the red light in accordance with the red value of a corresponding data pixel, and is then externally projected at a given location. Green light is then reflected off the same SLM pixel, where the SLM pixel is driven to modulate the green light according to the value of the corresponding data pixel, and is externally projected at the same location. Finally, blue light is reflected off this SLM pixel, where the SLM pixel is driven according to the value of the corresponding blue data pixel, and is also externally projected at the same location. Although sequential projection of light of different colors is actually performed, the net effect to the human eye is to see the proper color of the pixel, made up of its red, green, and blue components. As an example of such SLM pixel utilization, the SLM pixels of the region 202 of FIG. 2 may be utilized to sequentially reflect red, green, and blue light in accordance with the red, green, and blue values of the image data.

Another way to accomplish projection of light is to simultaneously use three different SLM pixels for each pixel of the image data, corresponding to the different color components of the pixel. For example, for a given pixel of the image data, red light is reflected off a first SLM pixel, where the SLM pixel is driven in accordance with the red value of the corresponding image data pixel, green light is reflected off a second SLM pixel, where the SLM pixel is driven in accordance with the green value of the image data pixel, and blue light is reflected off a third SLM pixel, where the SLM pixel is driven in accordance with the pixel's blue data value. The red, green, and blue light are then all externally projected at the same location, such that the proper color of the pixel, made up of its red, green, and blue components, is realized. In one embodiment, each region that satisfies the acceptable defective SLM pixel policy is utilized for reflecting a different color of light.

As an example of such SLM pixel utilization, the SLM pixels of the regions 202, 302, and 304 of FIG. 3 may be utilized to simultaneously modulate red, green, and blue light, respectively, in accordance with the red, green, and blue values, respectively, of the image data. In one embodiment, such regions, like the regions 202, 302, and 304 of FIG. 3, may be the same size and shape to accomplish the SLM pixel utilization described in the preceding paragraph. This can be accomplished by selecting the regions of SLM pixels that satisfy the acceptable defective SLM pixel policy so that they are the same size and shape. For instance, in FIG. 3, the regions 202, 302, and 304 may be further decreased in size and changed in shape so that they are ultimately the same size and shape.

Projection System (Projector)

Figure 7:
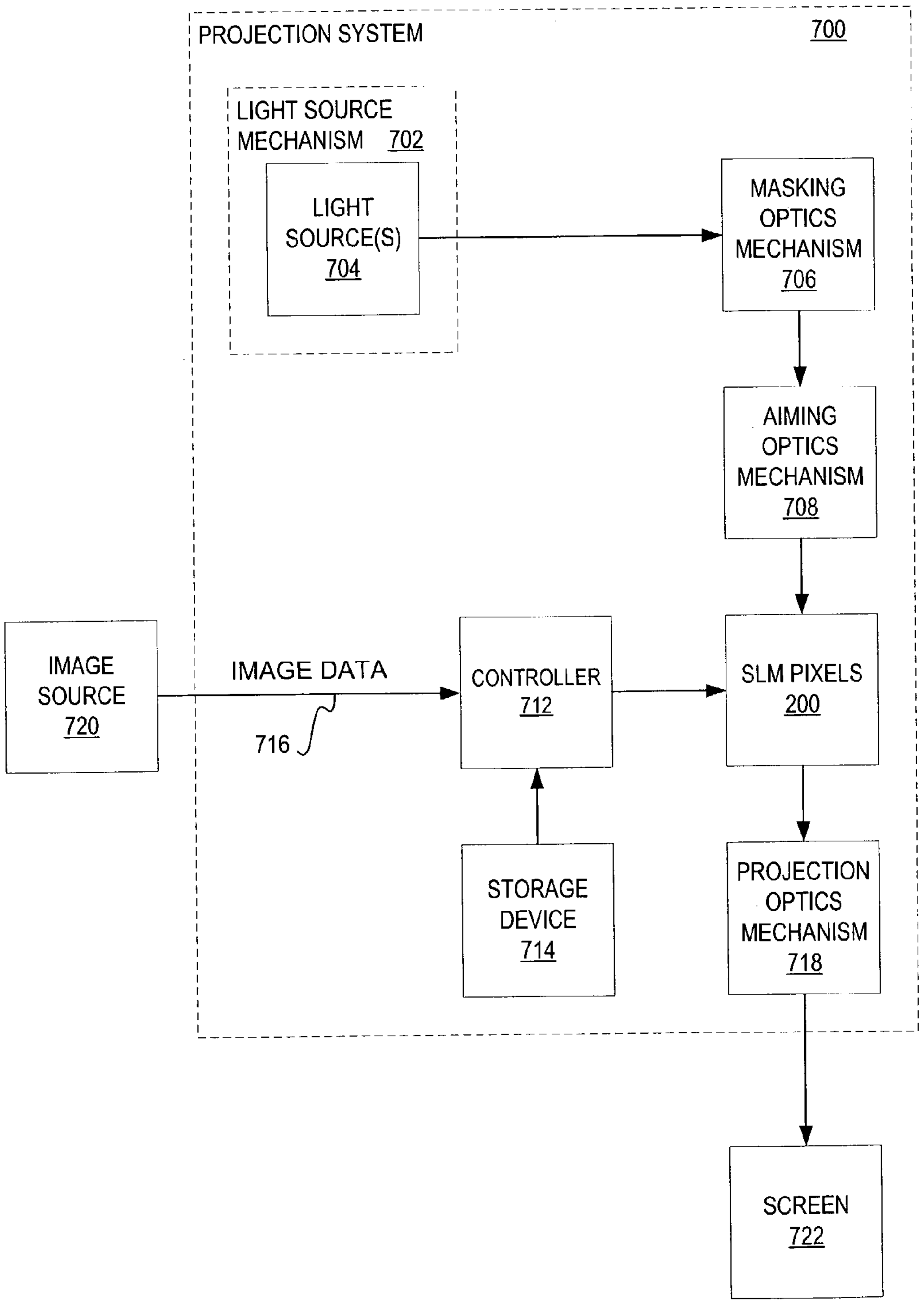
FIG. 7 is a block diagram of a projection system, according to an embodiment of the invention.

FIG. 7 shows a block diagram of a projection system 700 according to an embodiment of the invention. The system 700 may be implemented as a projector. As can be appreciated by those of ordinary skill within the art, the system 700 includes components specific to a particular embodiment of the invention, but may include other components in addition to or in lieu of the components depicted in FIG. 7. The projection system 700 includes a light source mechanism 702 that includes light sources 704, an optional masking optics mechanism 706, an optional aiming optics mechanism 708, the spatial light modulator (SLM) pixels 200 that have been described, and a projection optics mechanism 718. The system 700 also includes a controller 712 and a storage device 714, and is operatively or otherwise coupled to an image source 720 to receive image data 716, as well as a screen 722. Each of the optics mechanisms 706, 708, and 718 may include one or more mirrors, one or more lenses, and/or one or more of other types of constituent components.

The light source(s) 704 of the light source mechanism 702 output light. Each of the light source(s) 704 may be an ultra high pressure (UHP) mercury vapor arc lamp, or another type of light source. For instance, the light source(s) may be other types of light bulbs, as well as other types of light sources such as light-emitting diodes (LED's), and so on. The light output by the light source(s) 704 is for ultimate modulation by the SLM pixels 200. The masking optics mechanism 706, where present, masks defective SLM pixels of the SLM pixels 200, as has been described, whereas the internal or external aiming optics mechanism 708, where present, guides the light as output by the light source(s) 704 to the SLM pixels 200 for correct modulation thereby.

That is, the masking optics mechanism 706 masks defective SLM pixels within the regions that satisfy and/or fail the acceptable defective SLM pixel policy, whereas the aiming optics mechanism 708 guides the light to appropriate SLM pixels within the regions that satisfy the policy. The masking optics mechanism 706 may, for instance, not permit significant amount of light from defective pixels to be projected. The aiming optics mechanism 708 may, for instance, aim the light from the regions of SLM pixels that satisfy the policy as projected, especially in an embodiment of the invention in which a multiple-panel projection system is being implemented. The aiming optics mechanism 708 may in such an embodiment have the capacity to aim light from the SLM pixels 200, which is not specifically depicted in FIG. 7. In at least one embodiment of the invention, information regarding the defective SLM pixels and/or the regions of SLM pixels that satisfy the acceptable defective SLM policy is provided to the mechanisms 706 and 708. This enables the mechanism 706 to know which SLM pixels to mask, and the mechanism 708 to know which SLM pixels to utilize.

The controller 712 controls the regions of the SLM pixels 200 that satisfy the acceptable defective SLM pixel policy in accordance with the image data 716 that is received from the image source 720. The image source 720 may be a computing device, such as a computer, or another type of electronic and/or video device. The controller 712 thus enables the projection system 700 to realize a resolution based on the regions of the SLM pixels 200 that satisfy the acceptable SLM pixel policy, as has been described, which is less than a resolution based on all the pixels 200, including the regions of the SLM pixels 200 that both satisfy and fail the policy. The controller 712 in one embodiment particularly sets the SLM pixels 200 in accordance with the intensity or other values of the pixels of the image data 716. The controller 712 determines which regions of the SLM pixels 200 that satisfy the policy based on locational information of such regions stored in the storage device 714, which may be a non-volatile memory or other type of storage device.

The controller 712 may in one embodiment enable a user to select the regions of the SLM pixels 200 that satisfy, and/or regions that do not satisfy, the acceptable defective SLM pixel policy, where this policy is user determined and hence subjective to the user. Once the user selects these regions, the controller 712 stores the locational information thereof in the storage device 714. Alternatively, the storage device 714 may have this information stored therein at some point during the manufacture of the projection system 700, such that the information is readily available to the controller 712 by the time the first end user of the system 700 wishes to utilize the system 700. The storage device 714 may be external or internal to the system 700. Furthermore, the controller 712 may scale the image data 716 from one resolution to another, so that the resolution of the image data 716 ultimately conforms to that of the regions of the SLM pixels 200 that satisfy the acceptable defective SLM pixel policy. Alternatively, the controller 712 may receive the image data 716 as having the same resolution as that of the regions of the SLM pixels 200 that satisfy the acceptable defective SLM pixel policy.

The regions of the SLM pixels 200 that satisfy the acceptable defective SLM pixel policy ultimately modulate the light output by the light sources 704 in accordance with the image data 716 as controlled by the controller 712. The image data 716 may be a still image or a moving image, for instance. The projection optics mechanism 718 projects this light externally or outward from the projection system 700, where it is displayed on the screen 722, or another physical object, such as a wall, and so on. The screen 722 may be a front screen or a rear screen, such that the projection system 700 may be a front-projection system or a rear-projection system, as can be appreciated by those of ordinary skill within the art. The projection optics mechanism 718 guides the light as modulated by the SLM pixels 200 outward from the system 700. The user of the projection system 700, and other individuals able to see the screen 722, are then able to view the image data 716.

Figure 8:
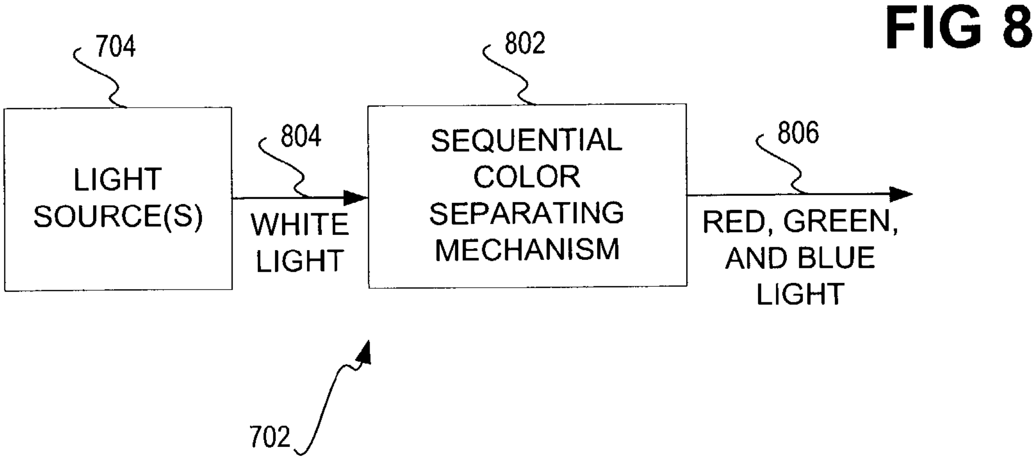
FIGS. 8 and 9 are block diagrams of the light source mechanism of the projection system of FIG. 7, according to different embodiments of the invention.
Figure 9:
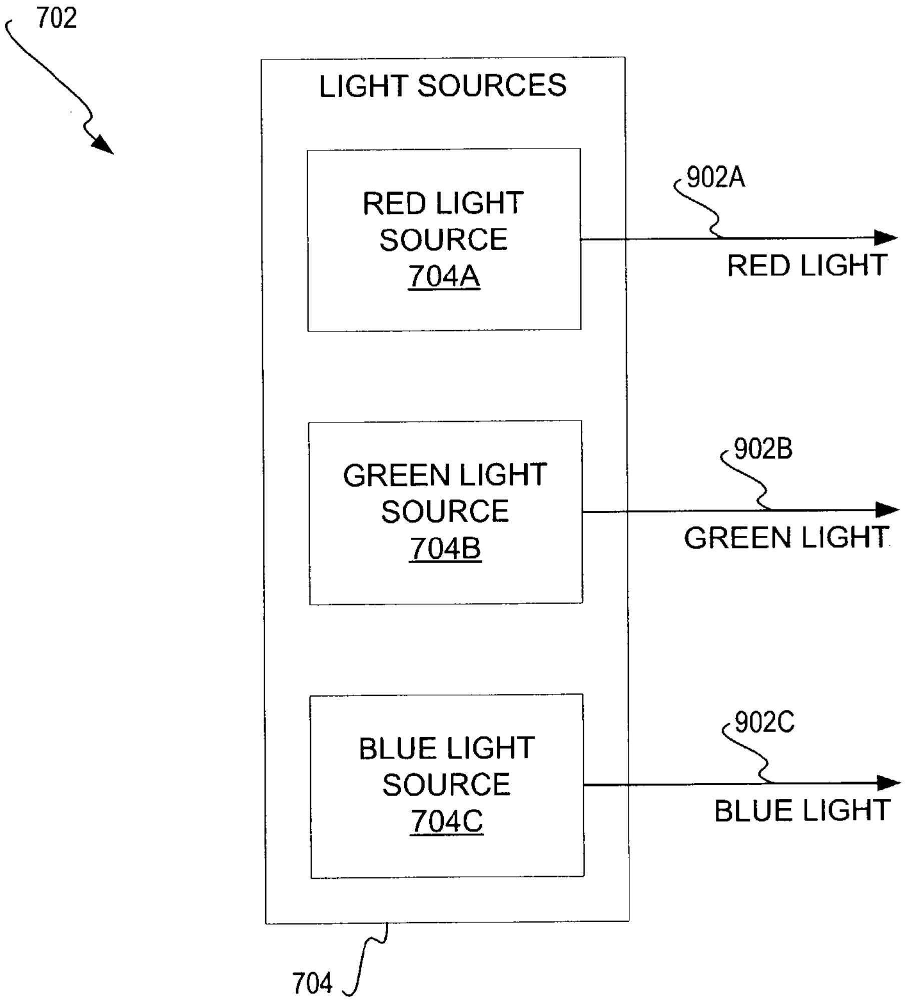

FIGS. 8 and 9 show how the light source mechanism 702 of FIG. 7 can be implemented, according to varying embodiments of the invention. In FIG. 8, the mechanism 702 includes the light source(s) 704, and a sequential color-separating mechanism 802. The light source(s) 704, such as a single light source, output substantially white light 804, which includes substantially all the different colors of light. The sequential color-separating mechanism 802 at different times separates out different colors of the white light 804, as the light 806. For instance, where the constituent color components into which the image data 716 of FIG. 7 is divisible are red, green, and blue, the mechanism 802 may separate out red light, followed by green light, and followed by blue light. The mechanism 802 may in particular be a color wheel in one embodiment of the invention, which has red, green, and blue filter parts, optionally among others. When the red filter part is in front of the white light 804, the light 806 is red, when the green filter part is in front of the light 804, the light 806 is green, and when the blue filter part is in front, the light 806 is blue.

In FIG. 9, the mechanism 702 includes three particular light sources 704: the red light source 704A, the green light source 704B, and the blue light source 704C. The red light source 704A outputs red light 902A, the green light source 704B outputs green light 902B, and the blue light source 704C outputs blue light 902C. Each of the light sources 704A, 704B, and 704C may be the same or different one or more light sources. For instance, the light source 704A may be one or more red sources of light, such as red LED's or red light bulbs, the light source 704B may be one or more green sources of light, and the light source 704C may be one or more blue sources of light. As another example, the same or different white light source(s) may be utilized by each of the light sources 704A, 704B, and 704C, where each of the light sources 704A, 704B, and 704C have an appropriately colored filter to transform the white light into the appropriately colored light 902A, 902B, and 902C, respectively. That is, the light source 704A may include a red filter, the light source 704B may include a green filter, and the light source 704C may include a blue filter.

As can be appreciated by those of ordinary skill within the art, other implementations of the light source mechanism 702 of FIG. 7 may also be used, and still be encompassed by embodiments of the invention. As one such example, colored light may be sequenced onto the SLM pixels. For instance, red light may first be projected onto the SLM pixels, then green light, and finally blue light may be output onto the SLM pixels.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A method comprising:

determining that a plurality of spatial light modulator (SLM) pixels includes one or more first regions of SLM pixels that satisfy an acceptable defective SLM pixel policy and one or more second regions of SLM pixels that fail the acceptable defective SLM pixel policy; and, utilizing the one or more first regions of SLM pixels within a projection system having a first resolution that is less than a second resolution that utilizing both the one or more first regions of SLM pixels and the one or more second regions of SLM pixels would have provided.

2. The method of claim 1, further comprising, after determining that the plurality of SLM pixels includes the one or more first regions of SLM pixels and the one or more second regions of SLM pixels, storing locational information regarding at least one of the one or more first regions of SLM pixels and the one or more second regions of SLM pixels, such that utilizing the one or more first regions of SLM pixels within the projection system comprises utilizing the locational information as stored.

3. The method of claim 1, wherein determining that the plurality of SLM pixels includes the one or more first regions of SLM pixels and the one or more second regions of SLM pixels comprises determining the one or more first regions of SLM pixels as a contiguous subset of SLM pixels of the plurality of SLM pixels.

4. The method of claim 3, wherein determining the one or more first regions of SLM pixels as the contiguous subset of SLM pixels of the plurality of SLM pixels comprises determining the one or more first regions of SLM pixels as a rectangular subset of SLM pixels of the plurality of SLM pixels.

5. The method of claim 1, wherein determining that the plurality of SLM pixels includes the one or more first regions of SLM pixels and the one or more second regions of SLM pixels comprises determining the one or more first regions of SLM pixels as a plurality of contiguous regions of SLM pixels of the plurality of SLM pixels.

6. The method of claim 1, wherein determining that the plurality of SLM pixels includes the one or more first regions of SLM pixels and the one or more second regions of SLM pixels comprises determining that the plurality of SLM pixels includes the one or more first regions of SLM pixels and the one or more second regions of SLM pixels prior to complete manufacture of the projection system.

7. The method of claim 1, wherein determining that the plurality of SLM pixels includes the one or more first regions of SLM pixels and the one or more second regions of SLM pixels comprises determining that the plurality of SLM pixels includes the one or more first regions of SLM pixels and the one or more second regions of SLM pixels after complete manufacture of the projection system.

8. The method of claim 1, wherein determining that the plurality of SLM pixels includes one or more first regions of SLM pixels and one or more second regions of SLM pixels comprises determining that SLM pixels of the one or more first regions are all operational and that each second region of SLM pixels includes at least one defective SLM pixel.

9. The method of claim 1, wherein determining that the plurality of SLM pixels includes one or more first regions of SLM pixels and one or more second regions of SLM pixels comprises determining that each first region of SLM pixels includes less than a predetermined number of defective SLM pixels and that each second region includes at least the predetermined number of defective SLM pixels.

10. The method of claim 1, wherein utilizing the one or more first regions of SLM pixels within the projection system having the first resolution comprises:

receiving image data having the second resolution;

scaling the image data from the second resolution to the first resolution; and, projecting the image data as scaled to the first resolution using the one or more first regions of SLM pixels.

11. The method of claim 10, wherein projecting the image data as scaled to the first resolution using the one or more first regions of SLM pixels comprises sequentially projecting light of each of a plurality of constituent colors of the image data using the one or more first regions of SLM pixels.

12. The method of claim 10, wherein projecting the image data as scaled to the first resolution using the one or more first regions of SLM pixels comprises at least substantially simultaneously projecting each of a plurality of constituent colors of the image data using for each color a different at least one of the one or more first regions of SLM pixels.

13. The method of claim 10, wherein projecting the image data as scaled to the first resolution using the one or more first regions of SLM pixels comprises aiming projection of light to the one or more first regions of SLM pixels.

14. The method of claim 1, wherein utilizing the one or more first regions of SLM pixels within the projection system having the first resolution comprises:

receiving image data having the first resolution;

projecting the image data using the one or more first regions of SLM pixels.

15. The method of claim 14, wherein projecting the image data using the one or more first regions of SLM pixels comprises sequentially projecting light of each of a plurality of constituent colors of the image data using the one or more first regions of SLM pixels.

16. The method of claim 14, wherein projecting the image data using the one or more first regions of SLM pixels comprises at least substantially simultaneously projecting each of a plurality of constituent colors of the image data using for each color a different at least one of the one or more first regions of SLM pixels.

17. The method of claim 14, wherein projecting the image data using the one or more first regions of SLM pixels comprises aiming projection of light to the one or more first regions of SLM pixels.

18. The method of claim 1, wherein utilizing the one or more first regions of SLM pixels within the projection system having the first resolution comprises:

receiving image data having a third resolution less than the first resolution;

scaling the image data from the third resolution to the first resolution; and, projecting the image data as scaled to the first resolution using the one or more first regions of SLM pixels.

19. The method of claim 18, wherein projecting the image data as scaled to the first resolution using the one or more first regions of SLM pixels comprises sequentially projecting light of each of a plurality of constituent colors of the image data using the one or more first regions of SLM pixels.

20. The method of claim 18, wherein projecting the image data as scaled to the first resolution using the one or more first regions of SLM pixels comprises at least substantially simultaneously projecting each of a plurality of constituent colors of the image data using for each color a different at least one of the one or more first regions of SLM pixels.

21. The method of claim 18, wherein projecting the image data using the one or more first regions of SLM pixels comprises aiming projection of light to the one or more first regions of SLM pixels.

22. The method of claim 1, wherein utilizing the one or more first regions of SLM pixels within the projection system having the first resolution comprises:

receiving image data having a third resolution greater than the first resolution;

scaling the image data from the third resolution to the first resolution; and, projecting the image data as scaled to the first resolution using the one or more first regions of SLM pixels.

23. The method of claim 22, wherein projecting the image data as scaled to the first resolution using the one or more first regions of SLM pixels comprises sequentially projecting light of each of a plurality of constituent colors of the image data using the one or more first regions of SLM pixels.

24. The method of claim 22, wherein projecting the image data as scaled to the first resolution using the one or more first regions of SLM pixels comprises at least substantially simultaneously projecting each of a plurality of constituent colors of the image data using for each color a different at least one of the one or more first regions of SLM pixels.

25. The method of claim 22, wherein projecting the image data using the one or more first regions of SLM pixels comprises aiming projection of light to the one or more first regions of SLM pixels.

26. The method of claim 1, wherein utilizing the one or more first regions of SLM pixels within the projection system having the first resolution comprises optically masking the one or more second regions of SLM pixels.

27. The method of claim 1, wherein utilizing the one or more first regions of SLM pixels within the projection system having the first resolution comprises effectively removing defective SLM pixels of the one or more second regions.

28. An electronic device for utilization within a projection system comprising:

one or more first regions of spatial light modulator (SLM) pixels that satisfy an acceptable defective SLM pixel policy and that are actively utilized to provide the projection system having a first resolution;

one or more second regions of SLM pixels that fail the acceptable defective SLM pixel policy and that are non-utilized in providing the projection system having the first resolution; and, a memory to store locational information regarding at least one of the one or more first regions and the one or more second regions, wherein the one or more first regions of SLM pixels and the one or more second regions of SLM pixels when both utilized would otherwise provide the projection system with a second resolution greater than the first resolution.

29. The electronic device of claim 28, wherein the first resolution is less than an originally intended second resolution that takes into account both the one or more first regions of SLM pixels and the one or more second regions of SLM pixels.

30. The electronic device of claim 28, wherein the one or more first regions of SLM pixels comprises a first contiguous region of SLM pixels and the one or more second regions of SLM pixels comprises a second contiguous region of SLM pixels.

31. The electronic device of claim 30, wherein the first contiguous region of SLM pixels comprises a rectangular region of SLM pixels corresponding to the first resolution.

32. The electronic device of claim 28, wherein the one or more first regions of SLM pixels comprises a plurality of first contiguous regions of SLM pixels and the one or more second regions of SLM pixels comprises a plurality of second contiguous regions of SLM pixels.

33. The electronic device of claim 28, wherein the acceptable defective SLM pixel policy comprises deeming a region of SLM pixels as non-defective where no SLM pixels of the region are defective.

34. The electronic device of claim 28, wherein the acceptable defective SLM pixel policy comprises deeming a region of SLM pixels as non-defective where less than a predetermined number of SLM pixels of the region are defective.

35. The electronic device of claim 28, wherein defective SLM pixels of the one or more second regions of SLM pixels are effectively removed.

36. The electronic device of claim 28, wherein the electronic device is an integrated circuit (IC).

37. A projection system comprising:

a plurality of spatial light modulator (SLM) pixels including one or more first regions of SLM pixels that satisfy an acceptable defective SLM pixel policy and one or more second regions of SLM pixels that fail the acceptable defective SLM pixel policy;

one or more light sources to output light for modulation by the plurality of SLM pixels;

a projection optics mechanism to guide the light as reflected by the plurality of SLM pixels outward from the projection system; and, a controller to control the one or more first regions of SLM pixels in accordance with image data to realize a first resolution utilizing the one or more first regions of SLM pixels that is less than a second resolution that utilizing both the one or more first regions of SLM pixels and the one or more second regions of SLM pixels would have realized.

38. The projection system of claim 37, wherein the one or more first regions of SLM pixels comprises one rectangular region.

39. The projection system of claim 37, further comprising a storage device to store locational information regarding at least one of the one or more first regions of SLM pixels and the one or more second regions of SLM pixels, the locational information utilized by the controller in controller the one or more first regions of SLM pixels in accordance with the image data to realize the first resolution.

40. The projection system of claim 39, wherein the controller enables a user to select at least one of the one or more first regions of SLM pixels and the one or more second regions of SLM pixels, the locational information of which is stored by the storage device.

41. The projection system of claim 39, wherein the locational information stored by the storage device is determined prior to complete manufacture of the projection system.

42. The projection system of claim 37, wherein the controller receives the image data as having the second resolution, and scales the image data from the second resolution to the first resolution prior to controlling the one or more first regions of SLM pixels in accordance therewith to realize the first resolution.

43. The projection system of claim 37, wherein the controller receives the image data as having the first resolution.

44. The projection system of claim 37, wherein the controller receives the image data as having a third resolution less than the first resolution, and scales the image data from the third resolution to the first resolution prior to controlling the one or more first regions of SLM pixels in accordance therewith to realize the first resolution.

45. The projection system of claim 37, wherein the controller receives the image data as having a third resolution greater than the first resolution, and scales the image data from the third resolution to the first resolution prior to controlling the one or more first regions of SLM pixels in accordance therewith to realize the first resolution.

46. The projection system of claim 37, further comprising a sequential color-separating mechanism to separate the one or more light sources into a plurality of colors in a sequential manner, the controller controlling the one or more first regions of SLM pixels in accordance with a constituent color of the image data corresponding to a current color of the plurality of colors into which the sequential color-separating mechanism has separated the one or more light sources.

47. The projection system of claim 46, wherein the sequential color-separating mechanism comprises a color wheel.

48. The projection system of claim 37, wherein the one or more light sources comprises at least one light source for each of a plurality of constituent colors into which the image data is divisible, the controller controlling a different at least one of the one or more first regions of SLM pixels for each of the plurality of constituent colors into which the image is divisible.

49. The projection system of claim 37, further comprising an aiming optics mechanism to guide the light as output by the one or more light sources correctly to the one or more first regions of SLM pixels for modulation thereby.

50. The projection system of claim 37, further comprising a masking optics mechanism to mask defective SLM pixels of the one or more second regions of SLM pixels.

51. A projection system comprising:

a plurality of spatial light modulator (SLM) pixels including one or more first regions of SLM pixels that satisfy an acceptable defective SLM pixel policy and one or more second regions of SLM pixels that fail the acceptable defective SLM pixel policy;

one or more light sources to output light for reflection by the plurality of SLM pixels;

a projection optics mechanism to guide the light as reflected by the plurality of SLM pixels from the projection system; and, means for controlling the one or more first regions of SLM pixels in accordance with image data to realize a first resolution utilizing the one or more first regions of SLM pixels and non-utilizing the one or more second regions of SLM pixels, wherein the one or more first regions of SLM pixels and the one or more second regions of SLM pixels when both utilized by the means would otherwise realize a second resolution greater than the first resolution.

52. The projection system of claim 51, wherein the first resolution is less than an originally intended second resolution that takes into account both the one or more first regions of SLM pixels and the one or more second regions of SLM pixels.

53. The projection system of claim 51, further comprising a sequential color-separating mechanism to separate the one or more light sources into a plurality of colors in a sequential manner, the means controlling the one or more first regions of SLM pixels in accordance with a constituent color of the image data corresponding to a current color of the plurality of colors into which the sequential color-separate mechanism has separated the one or more light sources.

54. The projection system of claim 51, wherein the one or more light sources comprises at least one light source for each of a plurality of constituent colors into which the image data is divisible, the controller controlling a different at least one of the one or more first regions of SLM pixels for each of the plurality of constituent colors into which the image is divisible.

55. The projection system of claim 51, further comprising at least one of:

a storage device to store locational information regarding at least one of the one or more first regions of SLM pixels and the one or more second regions of SLM pixels, the locational information utilized by the means in controlling the one or more first regions of SLM pixels in accordance with the image data to realize the first resolution;

an aiming optics mechanism to guide the light as output by the one or more light sources correctly to the one or more first regions of SLM pixels for reflection thereby; and, a masking optics mechanism to mask defective SLM pixels of the one or more second regions of SLM pixels.

* * * * *